No. 799,605. PATENTED SEPT. 12, 1905.
J. F. LESTER.
APPARATUS FOR ELECTRICALLY PURIFYING WATER.
APPLICATION FILED NOV. 28, 1904.
2 SHEETS—SHEET 1.
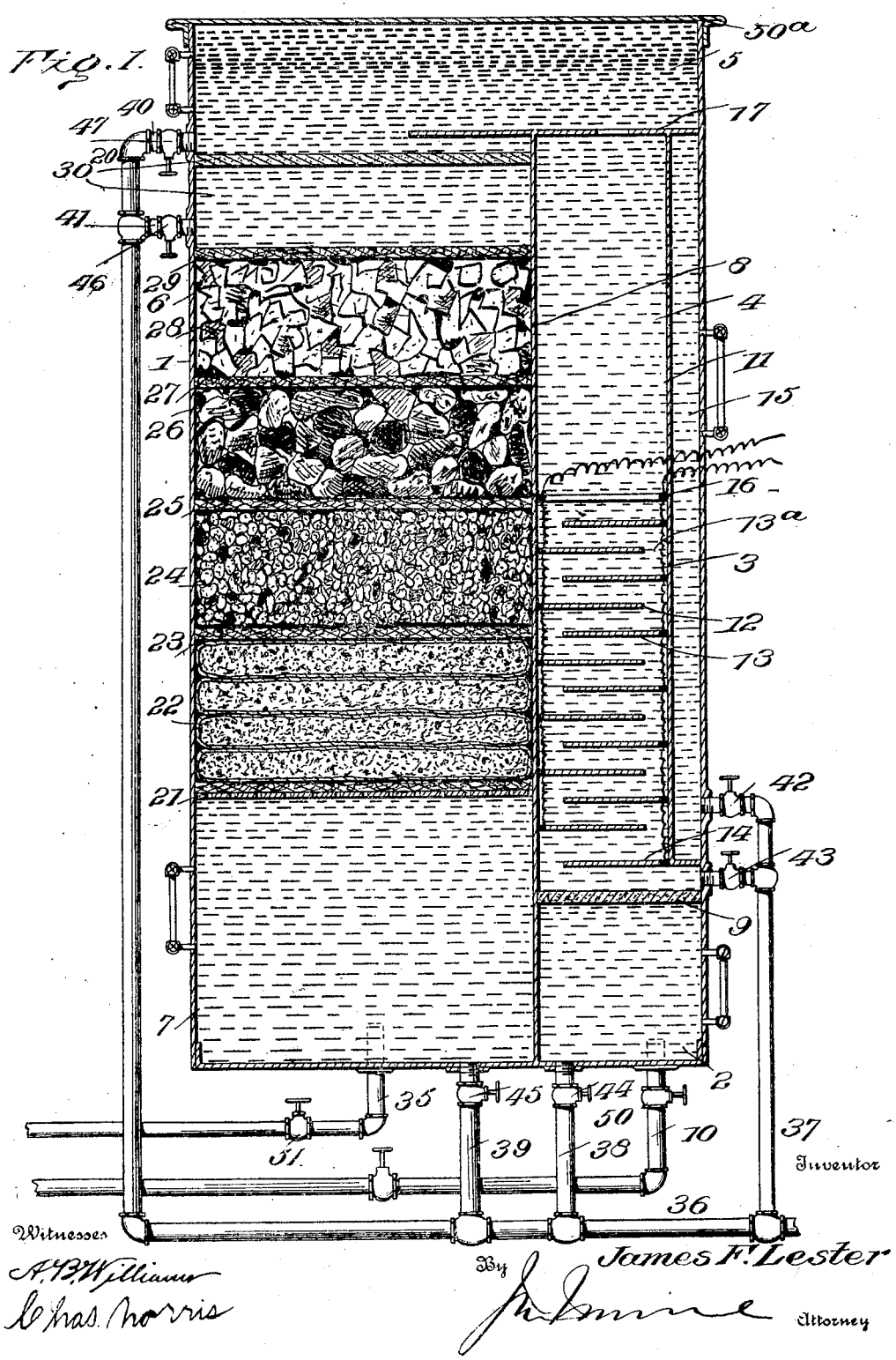
Witnesses
A. P. Williams
Chas. Norris
Inventor
James F. Lester
By [signature] Attorney No. 799,605. PATENTED SEPT. 12, 1905.
J. F. LESTER.
APPARATUS FOR ELECTRICALLY PURIFYING WATER.
APPLICATION FILED NOV. 28, 1904.
2 SHEETS—SHEET 2.
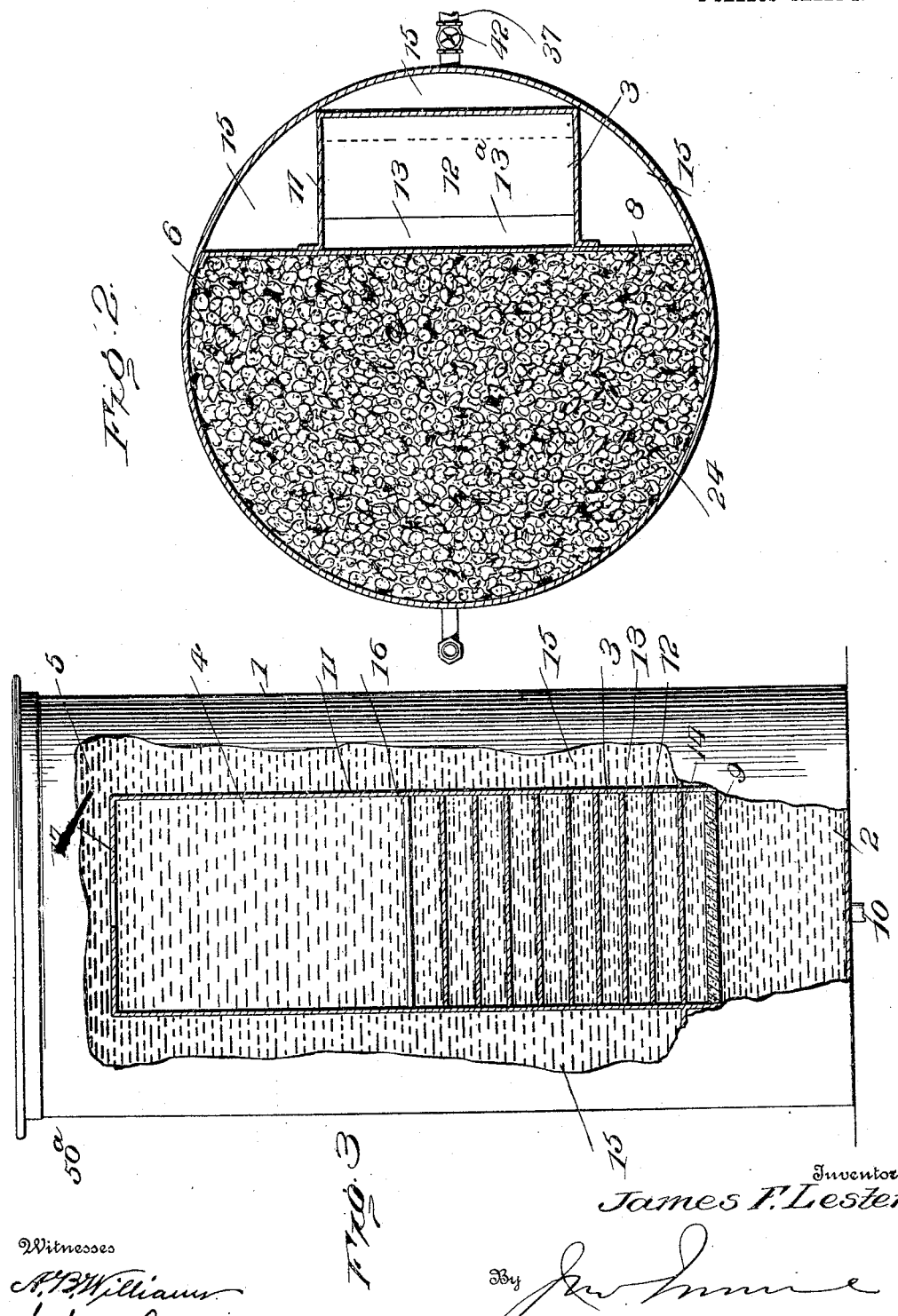
Witnesses
Inventor
James F. Lester
By
Attorney

UNITED STATES PATENT OFFICE.

JAMES F. LESTER, OF ATLANTA, GEORGIA, ASSIGNOR TO THE ELECTRIC WATER PURIFYING & FILTER COMPANY, A CORPORATION OF NEW YORK.

APPARATUS FOR ELECTRICALLY PURIFYING WATER.

No. 799,605.      Specification of Letters Patent.      Patented Sept. 12, 1905.

Application filed November 28, 1904. Serial No. 234,666.

*To all whom it may concern:*

Be it known that I, JAMES F. LESTER, a citizen of the United States, residing at Atlanta, in the county of Fulton and State of Georgia, have invented new and useful Improvements in Apparatus for Electrically Purifying Water, of which the following is a specification.

This invention relates to improvements in apparatus for purification of water by electrical means.

Purifying water by electricity has been attempted by others with various types of mechanism; but in each instance known to me failure has resulted because of the lack of unitary action of the mechanical and electrical means employed. This is due in many cases because of the separation of the mechanisms, which does not permit the electrodes to act on the impurities in the water for a sufficient time to accomplish the desired result. It is quite well known to those familiar with this art that there is a residue which accumulates after water has been electrically treated which in time clogs and stops the flow of water. The rapid and convenient elimination of this residue has been impractical in machines now used. In many cases total dismantling is necessary, which also tends to make the machines having their elements separated, a failure.

My present invention comprehends an apparatus wherein an electrolytic water-treating chamber, an ozonizing-chamber, and a filter are employed in a single casing, the electrolytic chamber and ozonizing-chamber being totally surrounded by water to prevent the heating of the water being treated.

A further object of the invention is to arrange the electrodes in the electrolytic chamber between each other to form a series of baffle-plates against which the water contacts and is treated, and to relieve the weight of the column of water in the ozonizing-chamber from the water between the baffle-plates the upper plate is formed with an opening sufficient for the exit of the water to the ozonizing-chamber, the baffle also serving to retard the progress of the water, and thereby concentrate the action of the ozone and gases.

A further object of the invention is to provide in an organized electrical water-purifier means for thoroughly washing out the various chambers that the residue incident to the cleansing and filtering of the water may be removed. The specific means employed for this purpose constitute a system of pipes and valves to allow of the introduction of a stream of water under pressure to force the residue and unsanitary particles accumulated from the apparatus to a sewer.

Other objects and advantages will be hereinafter referred to and be particularly pointed out in the claims.

In the drawings, Figure 1 is a vertical section of my improved apparatus. Fig. 2 is a cross-section of the same. Fig. 3 is a transverse section.

The numeral 1 indicates a casing in which is formed a water-receiving chamber 2, an electrolytic chamber 3, an ozonizing-chamber 4, an upper chamber 5, a filtering-chamber 6, and a pure-water receiver 7. A partition 8 divides the casing, and it terminates a short distance from the top, and near the bottom and between the partition 8 and the casing is a horizontal partition 9, of porous material. This forms the water-receiving chamber 2, in the bottom of which is the inlet-pipe 10. Said pipe extends upwardly from the bottom and into the chamber to prevent the sediment choking it. The water entering the water-receiving chamber passes through the porous partition, and the larger foreign particles therein are precipitated to the bottom, while the clear water passes into the electrolytic chamber 4. The electrolytic chamber is of a box-like structure 11, fastened against the partition 8, and extends upwardly to within a short distance of the top of the casing. Electrodes 12 and 13 extend, respectively, from the box-like structure and the partition 8, one fitting between the other and extending entirely across the chamber, but leaving a space 13ᵃ to form a zigzag course. The electrodes also form a plurality of baffle-plates with which the water contacts in its zigzag course through the electrolytic chamber. The bottom electrode 14 extends outside the electrolytic chamber and forms a bottom for the space which surrounds said chamber, while the top electrodes 16 are in a plane, and a space is formed between them for the exit of water to the ozonizing-chamber 4. The electrodes are electrically connected in any well-known manner and the current, &c., applied as may be deemed expedient to accomplish the desired result. After the water has been electrically treated it flows into the ozonizing-chamber, the latter being preferably a continuation of the electrolytic chamber. A plate 17, having a restricted opening, covers the ozonizing-chamber, and this plate also extends somewhat into the upper chamber. The space 15, surrounding the electrolytic and ozonizing chambers, communicates at the top with the upper chamber, and as the water is constantly being agitated the said chambers are kept cool, which is of the highest importance to obtain the best results when treating water with electricity. The water received in the electrolytic chamber having had the coarse sediment removed, the finer and more difficult particles will now be taken care of. Experience has demonstrated that these finer particles in the molecules of water, consisting of germs and foreign elements, can only be effectively separated by subjecting the water to electrical action for the production of ozone and other gases and in thoroughly agitating the water to more readily yield to the influence of the gases.

The purifying qualities of ozone being so well known, it is not deemed necessary to amplify them. It is sufficient to note that the value of this gas is considerably enhanced by violently agitating the water, as by forcing it against the electrodes. The position of the electrodes enables me to obtain this very essential result. The foreign substances separated from the water are collected on the electrodes, while the ozone generated is thoroughly disseminated in the water. The water charged with ozone flows into the ozonizing-chamber, where the agitation and mixing is still taking place to some extent. From the ozonizing-chamber the water passes through the opening in the plate 17 to the upper chamber. The ozone cannot escape, so that if there should be any impurities left in the water such impurities will be destroyed. This is the function of the upper chamber, as I have found that if the ozone can be confined in a body of water exceedingly beneficial results toward purifying it is accomplished.

The action of the electrical energy on the water produces a "milky scum," which in addition to fine particles in the charged water must be removed before thoroughly-purified water is secured. The scum is difficult to remove, inasmuch as it is so fine it is liable to be deposited at any point in the apparatus, particularly when the filtering operation takes place. Up to this period I have made no attempt to take care of the scum, rather allowing all time necessary for the ozone to thoroughly impregnate the water.

A short distance below the plate 17 is a horizontal partition 20, which may be of some porous material, the pores, however, being finer than those in the partition 9. The partition 20 is the top of the filter proper, and as a rule the milky scum referred to will accumulate thereon. The bottom of the filtering-chamber is indicated at 21 and may be perforated metal or the like, on which the filtering-beds are supported. The lower bed consists of a series of felt bags 22, filled with fine sand, so that when it is desired to clean the bed the bags can be readily removed, washed, and replaced. A layer of felt 23 is placed over the bed of bags, and the felt supports a bed of coarse sand, (indicated at 24,) over which is a layer of felt 25. On the felt 25 is a bed of charcoal 26, then a layer of felt 27, and a bed of broken stone 28, over which is a layer of felt 29. A space 30 is left between the felt 29 and partition 20 to receive the water as it trickles down from the upper chamber. The ozonized water is thoroughly filtered by the time it reaches the pure-water chamber, from whence it is drawn off through the pipe 35, which projects up into the said chamber.

The construction of the apparatus described electrically treats the water, mixes the ozone, and filters the water before the ozone has been liberated, producing a means for thoroughly purifying and filtering water. Retaining the ozone within the casing during the filtering process coacts to insure eliminating the foreign elements.

After the apparatus has been in use for some time it requires cleaning, and it is my purpose to do this cleaning by forcing water into the various chambers through a system of pipes.

36 indicates a pipe leading to a sewer, and 37, 38, 39, and 40 41 are branch pipes leading to the various chambers and which are connected to the pipe 36, and 42, 43, 44, 45, 46, and 47 indicate valves in said branch pipes. Valves 50 and 51 in the pipes 10 and 35 are used to control the admission and exit of water, as will be readily understood. To clean the apparatus, the valves 43, 44, 45, 46, and 47 are opened, and the valve 50 is closed and water introduced through the pipe 10. Water enters the chamber 2, and the sediment therein is forced out through the pipe 38, and the sediment in the bottom of the electrolytic chamber and the space 15 is forced out through the pipes 36 and 37. As the water rises to the chamber 5 the sediment and foreign substances are forced through the pipes 40 and 41. This operation effectually removes the foreign substance taken from the water without dismantling the apparatus, which is a decided convenience in operating a purifier of this type. After a long period of use the filtering-beds require cleaning, and to do this the cover 50$^a$ is removed, when access can be had to the filtering material.

The organization of an electrical water-treating means and a filter in a casing effectually eliminates the organic matter in the water. The generated ozone being confined and the water being kept in a turbulent state, the foreign substances are successfully segregated, which results in pure water being delivered from the pipe 35.

My invention is not limited to the purification of water, as it is susceptible of use in handling metal and other elements used in the manufacture of the various arts.

What I claim as new is—

1. A water-purifier comprising a casing, an electrolytic chamber therein, an ozonizing-chamber above and in communication with the electrolytic chamber and adapted to be completely filled with water, and a filter arranged adjacent said chambers, an inlet, and outlet at the bottom of the casing, said inlet supplying water under pressure to the electrolytic and ozonizing chambers and the outlet taking water from beneath the filter.

2. A water-purifier comprising a casing divided by a partition, an electrolytic chamber, and a superimposed ozonizing-chamber on one side of the partition adapted to be completely filled with water, a filter on the opposite side of the partition, and a water-inlet beneath the electrolytic chamber, whereby the water is forced through said chamber by external pressure and fed through the filter by gravity.

3. A water-purifier comprising a casing divided into two chambers by a partition, said partition terminating below the top of the casing to provide communication between said chambers, an electrolytic chamber and a superimposed ozonizing-chamber on one side of the partition, both the electrolytic and ozonizing chambers adapted to be filled with water, a water-filter on the opposite side of the partition, and a water-inlet beneath the electrolytic apparatus.

4. A water-purifier comprising a casing, an electrolytic chamber and superimposed ozonizing-chamber within the casing and adapted to be filled with water, a filter within the casing, a water-inlet below the electrolytic chamber, and a partition between said chamber and filter, whereby the water is compelled to pass upward under pressure through the electrolytic and ozonizing chambers in succession and downward through the filter.

5. A water-purifier comprising a casing having an inlet near the lower end, an electrolytic chamber and superimposed ozonizing-chamber within the casing and adapted to be filled with water, a filter within the casing, and means to compel the water to pass upward through the electrolytic and ozonizing chambers in succession and gravitate through the filter.

6. A water-purifier comprising a casing, a water-inlet near the bottom thereof, a water-outlet near the bottom thereof, a partition extending to near the top of the casing, an electrolytic chamber on one side of the partition above the inlet, an ozonizing-chamber above the electrolytic chamber and on the same side of the partition as said electrolytic chamber, a filter on the opposite side of said partition, and a chamber above and establishing communication between the ozonizing-chamber and filter.

7. A water-purifier comprising a casing divided by a vertical partition, a water-inlet near the bottom of the casing on one side of said partition, a water-outlet on the opposite side of said partition near the bottom of the casing, an electrolytic chamber and an ozonizing-chamber on one side of said partition and above the inlet, a filter on the opposite side of said partition and above the outlet, a chamber at the upper end of the casing above the partition for establishing communication between the chambers on the respective sides of the partition.

8. A water-purifier comprising a casing containing an electrolytic chamber, a superimposed ozonizing-chamber, a filtering-chamber, and a pure-water chamber, an inlet-pipe feeding water upward through the electrolytic and ozonizing chambers in succession, an outlet to deliver the water gravitating through the filter and pure-water chamber, a discharge-pipe, and pipes communicating with each of said chambers and with the discharge-pipe whereby any one or all of said chambers may be subjected to the action of water under pressure for cleaning.

9. An apparatus of the class described, comprising a casing, a receiving-chamber, an electrolytic chamber, an ozonizing-chamber arranged to provide a space between it and the casing, an upper chamber, a filter arranged to provide a space between it and the upper chamber, a pure-water chamber under the filter, and a system of drain-pipes communicating with each of the chambers set forth.

In testimony whereof I affix my signature in presence of two subscribing witnesses.

JAMES F. LESTER.

Witnesses:
ROB. SCHWARZ,
JNO. IMIRIE.